(12) United States Patent
Ercolano et al.

(10) Patent No.: US 7,997,635 B2
(45) Date of Patent: Aug. 16, 2011

(54) BISTABLE OPENING/CLOSING DEVICE, AND STORAGE COMPARTMENT COMPRISING SAME

(75) Inventors: Tony Ercolano, Wavignies (FR); Didier Ponthieu, La Neuville Saint Pierre (FR); Pascal Rumigny, Grouy en Thelle (FR); Cédric Habert, Le Fay Saint Quentin (FR); Pierre Guerreiro, Sannois (FR); Guy Heriquet, Saint-Gratien (FR); Stéphane Dannenhoffer, Nerville la Forêt (FR)

(73) Assignee: Faurecia Interieur Industrie, Nanterre (FR)

( * ) Notice: Subject to any disclaimer, the term of this patent is extended or adjusted under 35 U.S.C. 154(b) by 980 days.

(21) Appl. No.: 11/883,640

(22) PCT Filed: Mar. 23, 2006

(86) PCT No.: PCT/FR2006/000644
§ 371 (c)(1),
(2), (4) Date: Aug. 3, 2007

(87) PCT Pub. No.: WO2006/100390
PCT Pub. Date: Sep. 28, 2006

(65) Prior Publication Data
US 2008/0001423 A1    Jan. 3, 2008

(30) Foreign Application Priority Data

Mar. 23, 2005  (FR) ........................... 05 02887
Jun. 6, 2005   (FR) ........................... 05 05709

(51) Int. Cl.
*B60R 7/04*    (2006.01)
(52) U.S. Cl. .............. 296/37.1; 296/37.8; 296/37.12; 296/37.13; 296/37.16
(58) Field of Classification Search ............ 296/37.1, 296/37.8, 37.12, 37.13, 37.15, 37.16; 297/188.05, 297/188.07; 220/213; 383/33, 34, 43; 160/369
See application file for complete search history.

(56) References Cited

U.S. PATENT DOCUMENTS 2,019,674 A * 11/1935 Graebner .............. 296/37.13
6,471,276 B1 * 10/2002 Brunsman et al. ...... 296/37.13

FOREIGN PATENT DOCUMENTS

| DE | 103 26 883 A1 | 1/2005 |
| FR | 2 752 792 A | 3/1998 |
| GB | 1148694 A | 4/1969 |
| JP | 9-28508 | * 2/1997 |

* cited by examiner

*Primary Examiner* — Dennis Pedder
(74) *Attorney, Agent, or Firm* — Young & Thompson

(57) ABSTRACT

An opening/closing device includes a bistable device having a fixed member (24) delimiting one side of an opening providing access to a compartment, and a flexible mobile member (18), articulated on the fixed member proximate the ends of the access opening. The fixed and mobile members (24, 18) delimit jointly the entire access opening, and the mobile member (18) has two stable positions, one wherein it is adjacent to the fixed member (24), the other wherein only its ends are adjacent to the fixed member (24). The mobile member (18) is elongated and has naturally two stable positions with opposite convexities. The invention is applicable to vehicle passenger compartments.

10 Claims, 4 Drawing Sheets

BISTABLE OPENING/CLOSING DEVICE, AND STORAGE COMPARTMENT COMPRISING SAME

The invention relates to a bistable opening/closing device for a storage compartment, and to such a compartment.

The passenger compartment of a modern motor vehicle includes numerous storage devices located in the dashboard, in the door panels, on the backs of the seats, under the seats, etc. Some of them are open and others can be closed for aesthetic reasons or to retain their contents.

Storage compartments which can be closed comprise a closing device of some kind which is stable in the closed position. Mention may be made of glove boxes, which have a cover which can be closed and sometimes even locked in the closed position. Also known are storage devices intended for the door panels, the normal position of which is the closed position.

For example, document EP-0 899 159 describes a storage compartment which is located in the bottom portion of a door panel and whose outside wall, which is made of a mesh fabric, is held in its upper portion by a metal strip tensioned by a spring. In order to gain access to the inside of the compartment, a user must therefore pull the strip away from the door panel. As soon as he releases it, the edge of the compartment returns to the closed position.

Such devices have a disadvantage because, when the user has only one free hand, for example because he is holding the steering wheel, he is not able to get into the storage compartment. It would therefore be desirable for such storage compartments to have two stable positions, one closed, in which the contents are retained inside the compartment, and another in which an opening is freed so that a user can introduce or remove all kinds of objects.

Document DE-103 26 883 describes a storage compartment having two stable positions which are obtained by means of resilient devices that are mounted on the sides of a rectangular pocket and not at its opening.

The invention relates to storage compartments having two stable positions, one closed, in which the contents are retained inside the compartment and the external appearance of the storage compartment is aesthetically pleasing, and another in which the opening is largely freed. The storage compartments comprise a bistable opening/closing device. Thus, according to the invention, a movable side of the opening providing access to the compartment comprises a flexible member which has two stable positions obtained either by the very nature of the member itself or by the particular manner in which it is mounted at the opening of the compartment.

More precisely, the invention relates to a bistable opening/closing device for a storage compartment, which device is mounted at the opening of the compartment and comprises a fixed member delimiting one side of an opening providing access to the compartment, and a flexible movable member articulated with the fixed member close to the ends of the access opening, the device being such that the fixed and movable members together delimit the totality of the access opening, and the movable member has two stable positions, one in which it is adjacent to the fixed member and another in which only its ends are adjacent to the fixed member.

In an embodiment, the movable member is elongated and naturally has two stable positions with opposite convexities. The movable member is preferably a strip, at least one end of which is able to slide substantially in its longitudinal direction in a guide slot. For example, the strip is made of metal and has projections which give it its two stable positions.

In another embodiment, the movable member is elongated and naturally has only one stable state, and its two stable positions are given to it by its two ends being held, in the longitudinal direction, at two locations that are separated by a distance smaller than the length of the movable member.

In an exemplary embodiment, the movable member is longitudinally incompressible and the two ends are guided in slots close to the holding locations.

In another exemplary embodiment, the movable member is longitudinally incompressible and assumes an S- or Z-shape when it passes from one stable position to the other.

In another exemplary embodiment, the member is resiliently compressible in the longitudinal direction. The member can accordingly be formed by a helical spring of flattened cross-section or by a straight resilient band having sinuous elements between its lateral edges.

In advantageous embodiments, the movable member is articulated at least at one longitudinal end by means of a hinge, by means of a portion of reduced thickness of the movable member close to the end, or by means of a portion, made of a flexible material, of the wall of the compartment that surrounds the movable member.

The invention relates also to a storage compartment having an opening/closing device according to the preceding paragraphs, in which the fixed member is a portion of a cavity which delimits a rim surrounding a concave surface on the side of the storage space of the compartment, and the movable member is carried by a support having a surface which delimits part of the storage space of the compartment, its free edge having two stable positions, in one of which the edge is adjacent to the concave surface of the fixed member and in the other of which only the ends of the edge are adjacent to the fixed member, so that an opening is wholly delimited between the edge of the movable member and the concave surface of the fixed member.

The support of the movable member is preferably formed by a substantially flat member which delimits a rim, a portion of which joins the support and the movable member and another portion of which is free, the rim of the support being substantially adjacent to the rim of the cavity of the fixed member. In that manner, the edge of the movable member connects two locations on the rim of the support that are remote from one another.

The rim of the cavity can be substantially circular or substantially rectangular.

The support and the movable member are preferably formed from a flat material by a step of cutting out a hole that is to delimit the edge of the movable member and a portion of the rim of the support, and a step of shaping the portion of the flat material that is between the edge and the remainder of the rim of the support so that it projects relative to the flat material.

It is advantageous for the shaping step to comprise thinning the flat material in the region of the remainder of the rim of the support that does not delimit the hole.

The edge of the movable member is preferably formed by reinforcing the flat material, for example by folding the flat material on itself in the region of the edge.

The fixed member and its cavity are preferably formed from a flat material by a step of shaping the flat material that is within the rim so that it projects relative to the remainder of the flat material.

At least one of the flat materials of which the support and the movable member, on the one hand, and the fixed member and its cavity, on the other hand, are made is advantageously a nonwoven. Preferably, the nonwoven contains thermoplastic fibres and the shaping step is carried out by heating the flat material to a temperature above the melting point of the thermoplastic fibres. In an advantageous example, the nonwoven comprises substantially equal amounts of glass fibres and thermoplastic fibres. The thermoplastic is a polyolefin, for example, such as polypropylene.

In advantageous embodiments, the support of the movable member is a motor vehicle boot lining or a motor vehicle seat-back lining.

The storage compartment according to the invention therefore has many advantages. Its structure is very simple and very strong, and it is obtained using a small number of elements. In particular, the compartment can be formed in a motor vehicle boot or seat-back lining using the material that is already present, and it requires only a fixed member constituting a bottom of the compartment. Moreover, various aesthetic effects can easily be obtained, ranging from the least obtrusive when materials having the same properties are used for the bottom and the movable member, to various effects that are obtained by changing the shapes and colours.

Other features and advantages of the invention will be better understood upon reading the following description of exemplary embodiments, which makes reference to the accompanying drawings, in which.

Figure 1:
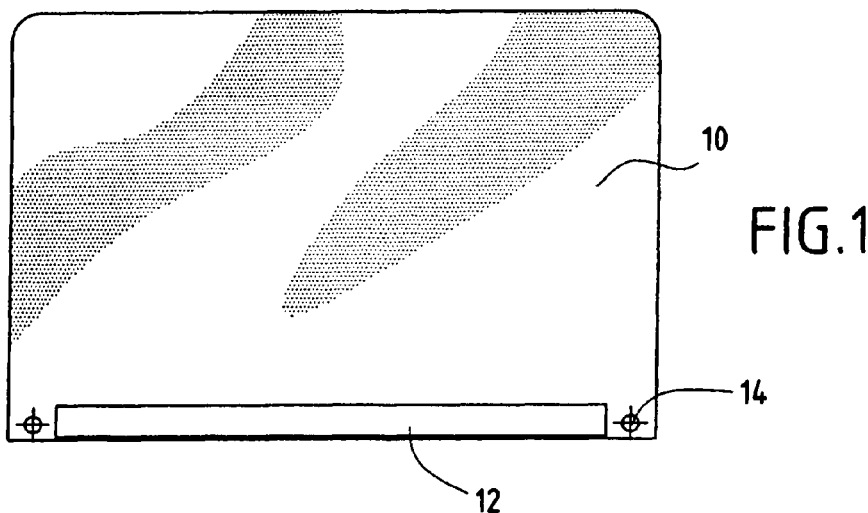
FIG. 1 is a side view of an outside wall of a storage compartment equipped with part of an opening/closing device according to the invention.

FIG. 1 shows, in plan form, a storage compartment outside wall 10 formed of a flexible material, such as a fabric, having at one edge a resilient strip 12 which is advantageously housed in a hem of the edge of the wall 10. Orifices 14 located beyond the ends of the strip are intended for the passage of fixing devices, such as screws.

Figure 2:
FIG. 2 is a front view of the device of FIG. 1.

In FIG. 2, the strip 12 is shown between two layers of the flexible material of the wall 10, but in a straight form which is not a stable position of the strip. As is shown in FIG. 3, the strip naturally assumes one of two stable positions, one of which is shown in FIG. 3, the other position being the reverse, that is to say upwardly convex, relative to the position shown in FIG. 3.

Figure 3:
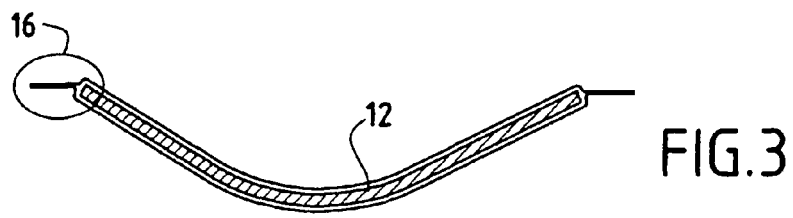
FIG. 3 shows one of the stable positions of the device of FIG. 2 during use.

It will be noted that when the orifices 14 are used for the passage of fixing devices, the material of the wall 10 forms an articulation close to the end of the strip 12, as shown by reference numeral 16 in FIG. 3.

When the position of FIG. 3 is a closed position, a fixed member forming the other wall of the storage compartment then substantially follows the convex contour of the strip 12. When the strip 12 occupies its opposite stable position, it will be understood that a large opening is formed between the strip 12 and the fixed member.

Figure 4:
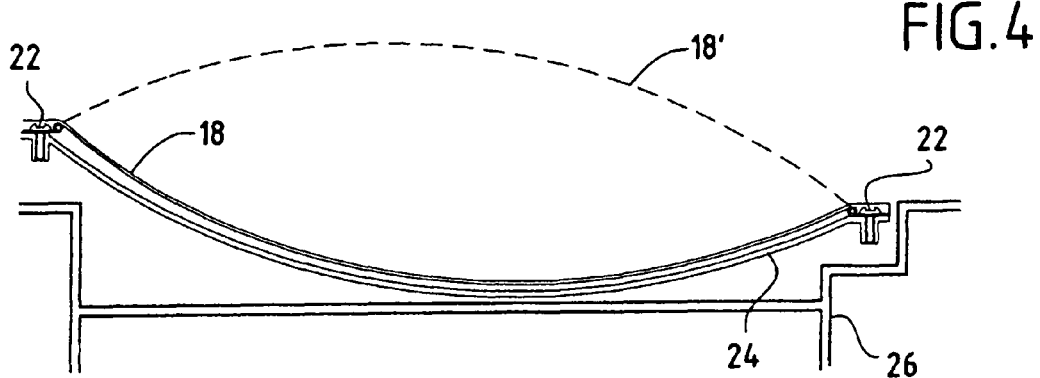
FIG. 4 shows an example of the mounting of a variant of the device of FIGS. 1 to 3.
Figure 5:
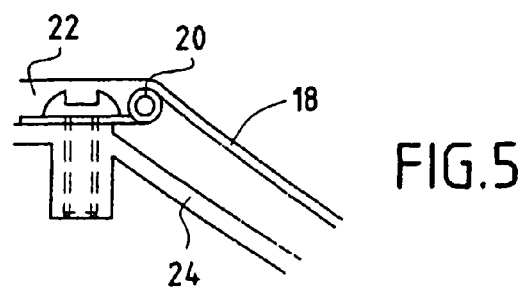
FIG. 5 is an enlargement of a fixing part of the device of FIG. 4.

FIG. 4 shows a variant in which a strip 18 is articulated by means of hinges 20 with fixing devices 22 at the ends of a fixed member 24 of rounded shape. That rounded shape substantially follows the shape of the strip 18 in one of its two stable positions, the fixed member 24 being supported by a framework such as 26, for example a framework of a motor vehicle door panel.

In FIG. 4, one of the stable positions (closed position) of the strip 18 is shown by full lines; the strip 18 can be gripped, preferably in the middle, and pulled away from the fixed member 24, and can assume a second stable position (open position), which is shown by broken lines 18' in FIG. 4.

Figure 6:
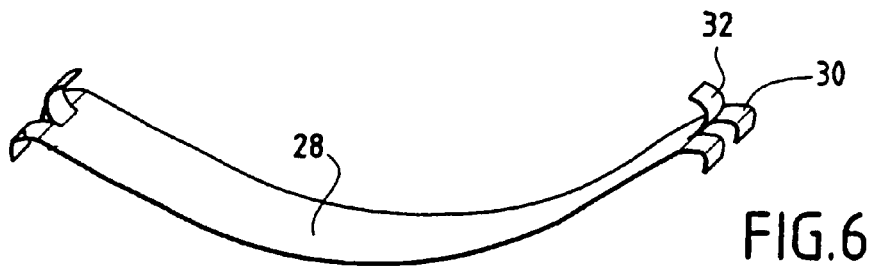
FIG. 6 shows a spring strip for a device according to a different embodiment of the invention.
Figure 7:
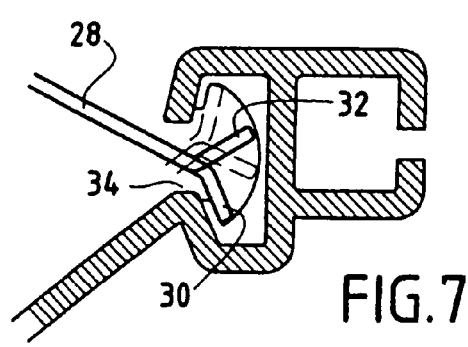
FIG. 7 is a partial section showing the mounting of the strip of FIG. 6.

FIGS. 6 and 7 show a different embodiment of the opening/closing device. In that device, the movable member has a flexible metal strip 28, shown in convex form, having at each end fingers 30, 32 which are to hold it in a cavity. FIG. 7 shows that, in its open position, the fingers 30, 32 of the strip 28 are located inside a cavity which opens by way of a slot 34. In the closed position, the strip assumes the position shown by broken lines, the fingers 30, 32 still holding the end of the strip 28 inside the cavity.

In the variant shown in FIG. 7, the strip 28 normally has a straight stable position (in contrast to the form shown in FIG. 6). The fingers 30, 32 cannot come away from the guide slot 34 because they are held by the bottom of the cavity. Owing to their rounded shape, they slide on the bottom and determine, between the cavities of the two opposite ends, a length that is less than the length of the strip 28, which is therefore forced to assume one or other of two convex stable positions, on one side or the other of the axis connecting the two cavities.

In another variant, the strip naturally has two stable positions which are obtained, for example, by forming projections in the thin metal material of the strip. In that case, it is not necessary for the cavity to have a bottom opposite the slot 34, because the strip naturally has a tendency to pull the fingers 30, 32 towards the guide slot 34.

Three variants have been described for articulating the strip that forms the movable member with the fixed member, an articulation formed by arranging the ends of a strip between two layers of fabric, an articulation formed by mounting hinges at the ends of the strip, and an articulation formed by housing one end of a strip, which end is equipped with fingers, in a cavity, behind a guide slot. Other types of articulation can be used, for example an articulation formed by a portion of reduced thickness of flexible material of the wall of the compartment that surrounds the movable member.

Strips have been described that have two stable positions, either natural or given by compression, but that always have the same length in the longitudinal direction. It is also possible to use a movable member that is resiliently compressible in the longitudinal direction.

In a first example, the movable member is formed by a helical spring of flattened cross-section, which has a tendency to be deformed in a plane perpendicular to the direction of flattening of its cross-section. In a second example, the movable member is a straight resilient band having a sinuous element between its lateral edges, so that it is longitudinally compressible. In a third example, the movable member is formed by at least two elements which are forced back in a resilient manner by a spring which can be compressed during passage from one stable position to the other.

Two examples of the application of the invention to a motor vehicle passenger compartment will now be considered.

Figure 8:
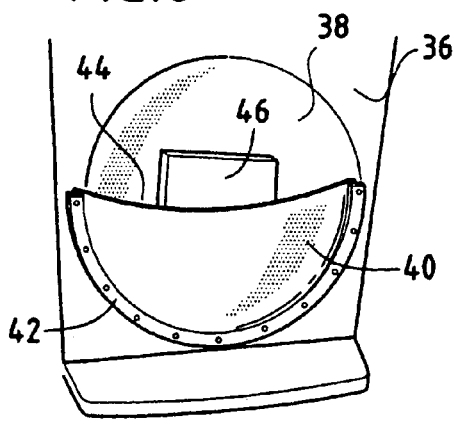
FIGS. 8, 9 and 10 show three positions of a storage compartment in an application example of the device according to the invention.
Figure 9:
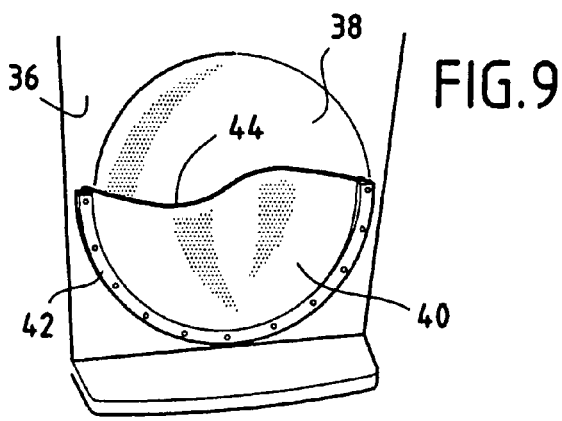
Figure 10:
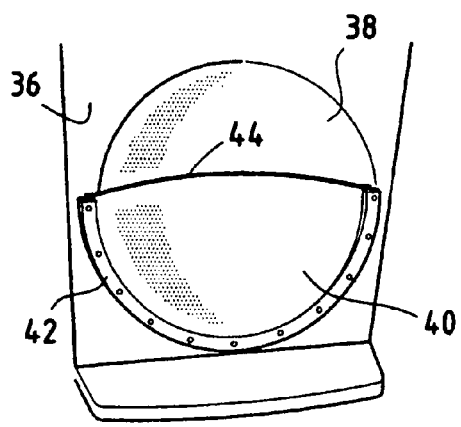

FIGS. 8 to 10 show such a storage compartment located in the lower portion of a door panel. In those figures, reference numeral 36 denotes a door panel in which a lenticular cavity 38 is formed. A substantially semi-circular wall 40 is fixed at its circular periphery, at 42, to the door panel 36 around the cavity 38. The upper edge 44 of the wall 40 is able to assume the position shown in FIG. 8, in which it has been moved away from the panel 36 and an object 46 can be placed in the storage compartment, and the position shown in FIG. 10, in which the edge 44 is substantially pressed against the wall of the lenticular cavity 38.

FIG. 9 shows the passage between the positions of FIGS. 8 and 10. It will be noted that the edge 44 assumes an S- or Z-shape as it passes from one position to the other.

Figure 11:
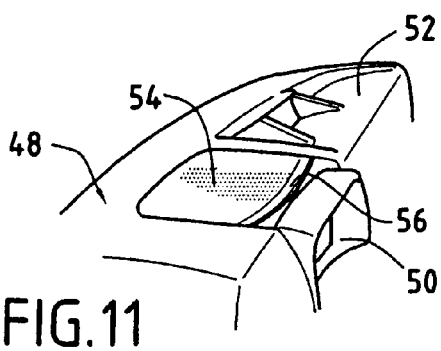
FIGS. 11 and 12 show, in perspective, a different embodiment of a storage compartment according to the invention.
Figure 12:
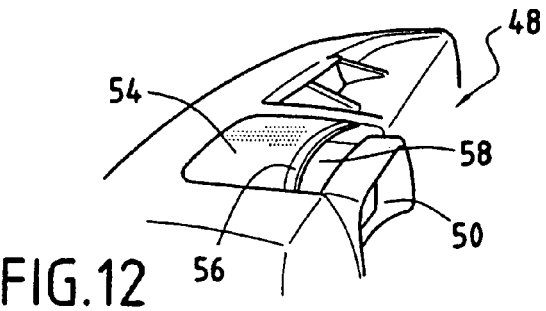

FIGS. 11 and 12 show another application example of a storage compartment according to the invention. In this example, a dashboard 48 has a portion such as 50 comprising, for example, instruments which can be observed by the driver. The dashboard includes other equipment 52. Behind the portion 50, a storage compartment having an outside wall 54 is formed above the dashboard. The front edge of the compartment is delimited by a movable member 56, which in FIG. 11 is in a downwardly curved position, substantially in contact with the dashboard. In the position shown in FIG. 12, the movable member 56 has been moved upwards and frees an opening 58 through which objects can be introduced into or removed from the compartment.

In the case of FIGS. 11 and 12, the two stable positions have important advantages. Firstly, because the compartment is arranged horizontally, it is desirable that it has a stable closed position to prevent objects placed therein from coming out. Above all, because it is located close to the driver, who must not let go of the steering wheel, it is advantageous that the driver is able to open the compartment with one hand, the compartment remaining open while the driver's hand introduces or removes an object. This arrangement is therefore virtually indispensable from the point of view of safety.

In an improvement to the compartment of FIGS. 11 and 12, the outside wall 54 can comprise, at a distance from the bottom and from the opening of the compartment, a bistable strip, for example as envisaged with reference to FIGS. 1 to 7. The compartment can then have two parts separated by the strip.

Figure 17:
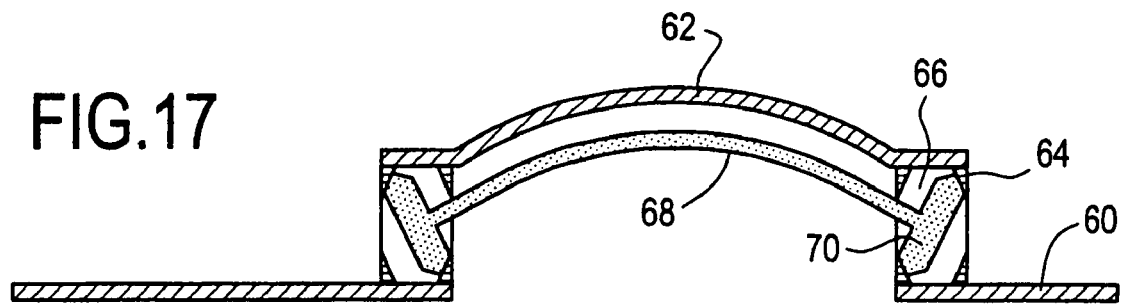
FIGS. 17 and 18 are top views of a variant of a compartment according to the invention in the closed and open positions, respectively.
Figure 18:
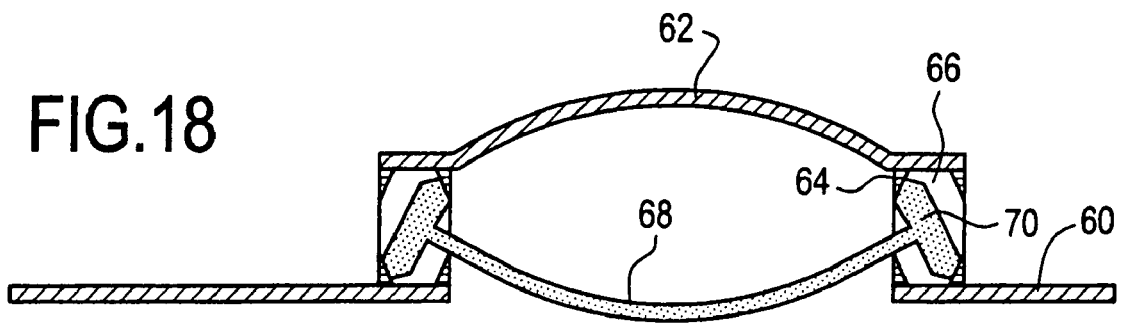
Figure 19:
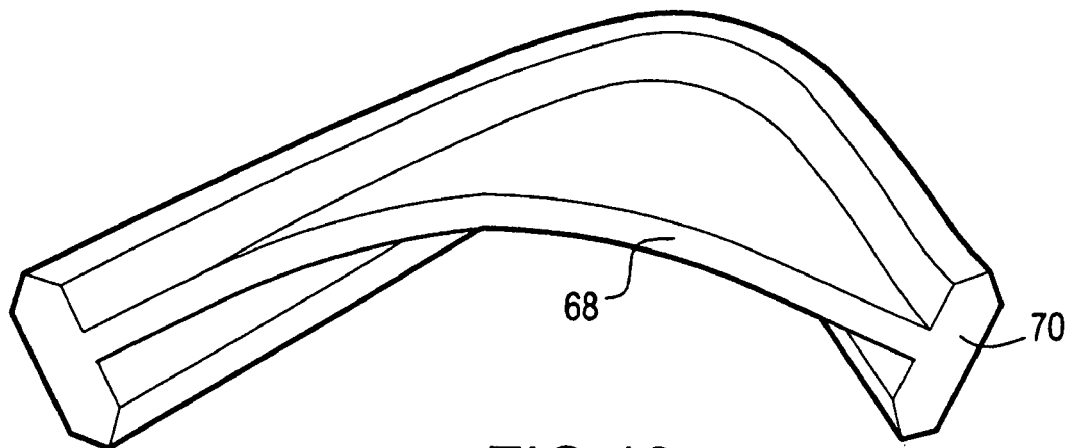
FIG. 19 is a view, in perspective, of the movable part of the compartment of FIGS. 17 and 18.

FIGS. 17 to 19 show another variant, analogous to the embodiments of FIGS. 8 to 10 on the one hand and 11 and 12 on the other hand. A support 62 of rounded shape is held on a panel 60 by a spacer 64 which delimits a cavity 66 of octagonal cross-section. A movable member 68 has a flange and a continuous edge band 70 forming a reinforcing element having triangular sides which are to be pressed against the sides of the cavity 66, in the two open and closed positions of the compartment.

Figure 13:
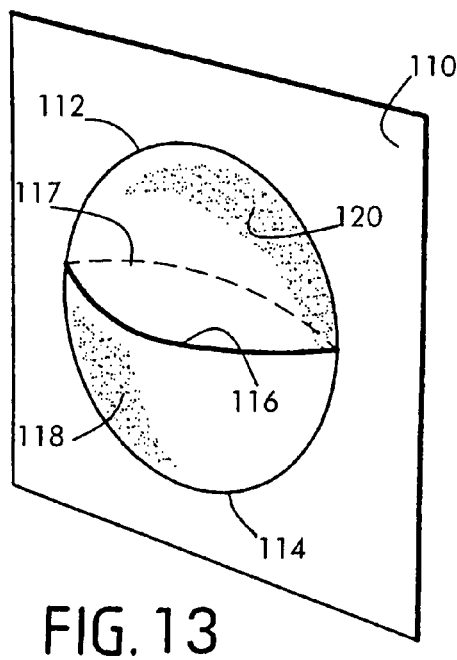
FIG. 13 is a view, in perspective, of an example of a storage compartment according to an embodiment of the invention, in the open position.

FIG. 13 is a view, in perspective, showing a storage compartment according to another embodiment of the invention, in open form. More precisely, a lining 110, which can be a motor vehicle boot lining or seat-back lining, is shown in rectangular shape; in reality, it can have the shape suited to its main lining function. The storage compartment proper is delimited by a rim 112, 114 comprising an upper rim portion 112 and a lower rim portion 114. An edge 116 of a movable member 118 is able to move between two stable positions. The open stable position of the edge 116 is shown in FIG. 13, and its closed stable position is shown in broken lines in FIG. 13 by reference numeral 117, as well as in FIG. 15. In the closed stable position, the edge 116 rests against the bottom 120 of the storage compartment.

It will be seen in FIG. 13 that the movable member 118 projects relative to the lining 110 (which is not necessarily flat but is only relatively flat, that is to say of small thickness, while being able to follow a gradually changing shape). The projecting portion forming the movable member 118 is enclosed between the lower rim portion 114 and the edge 116.

Figure 14:
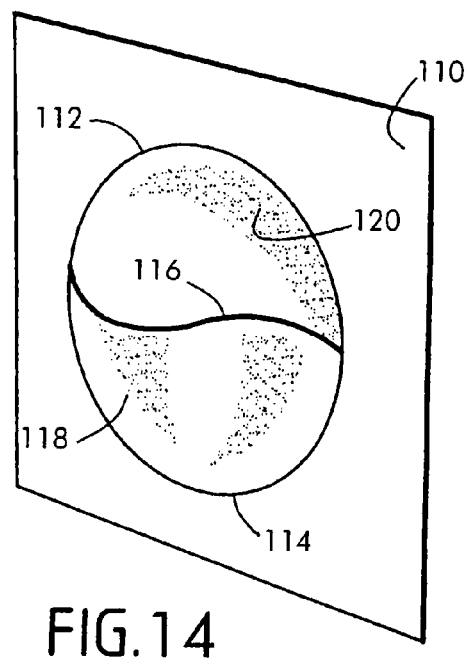
FIG. 14 is analogous to FIG. 13 but shows the movable member in the temporary intermediate position.
Figure 15:
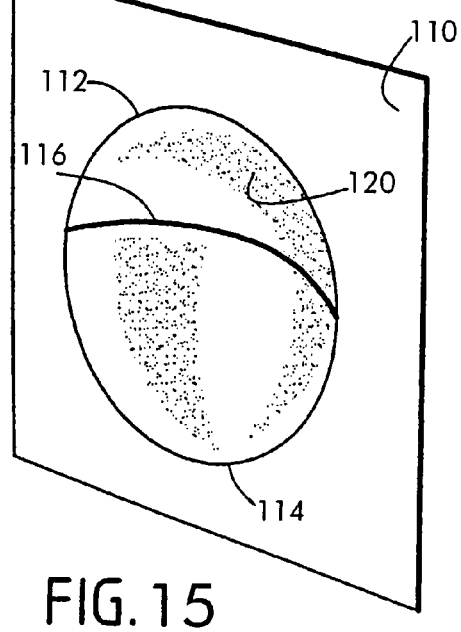
FIG. 15 shows the compartment of FIGS. 13 and 14 when it has been closed.

When the compartment has to be closed, pressure is applied, for example by means of a finger, on part of the edge 116 so that the edge 116 assumes an S-shape, shown in FIG. 14, and moves into the position shown in FIG. 15, in which the edge 116 is adjacent to the bottom 120 and is preferably flattened against it by resilient pressure.

Figure 16:
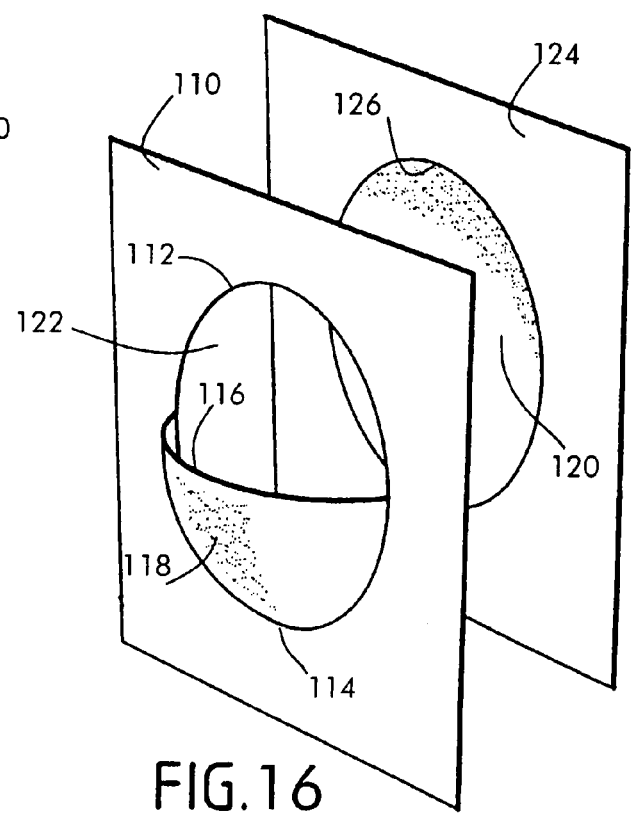
FIG. 16 shows two elements from which a storage compartment as shown in FIGS. 13 to 15 can be produced.

FIG. 16 shows the only two elements required to form the storage compartment of FIGS. 13 to 15. The lining 110 has a hole 122 formed between the upper rim portion 112 and the edge 116 of the movable member. In the region of the lower rim portion 114, the material of the lining 110 is preferably of reduced thickness so that the material is easy to bend on either side of the rim 114.

The second member 124 delimits a cavity 120 having a concave surface of the compartment side. In an advantageous embodiment, only that element 124, which comprises a flat portion just sufficient to surround the bottom 120, is located behind the lining 110 so that the rim 126 of the cavity delimiting the bottom 120 corresponds to the rim 112, 114 of the lining 110.

A storage compartment of generally circular shape has been shown. However, many other shapes are possible, for example a polygonal shape, a rectangular shape with rounded corners, etc., and even a trapezoidal or other shape suited to the particular configuration of the lining into which the storage compartment is incorporated.

Although other materials can be used, it is advantageous for the lining 110 at least, and preferably also the fixed member 124, to be formed of a nonwoven. Such a nonwoven comprises, at least in part, thermoplastic fibres, which on the one hand allows the necessary stiffness of the support parts surrounding the bottom 120 and the movable member 118 to be obtained, and on the other hand permits shaping in order to produce the projections that constitute the bottom 120 and the movable member 118.

Such a nonwoven can advantageously comprise glass fibres in addition to the thermoplastic fibres. In an example, the nonwoven contains substantially equal amounts of glass fibres and thermoplastic fibres. The thermoplastic can advantageously be a polyolefin, for example polypropylene.

Although the use of a nonwoven has been described, it is also possible to use other materials. For example, the fixed member 124 can be prepared in a simple manner by heat forming a sheet of plastics material.

The invention claimed is:

1. A bistable opening/closing device for a storage compartment, the opening/closing device being mounted at the opening of the compartment, the opening/closing device comprising:

an opening delimited on a first side by a fixed member and delimited on a second side by a flexible movable member, each of the fixed member and the movable member having two ends defining ends of the opening, the movable member being articulated with the fixed member at the two ends of the movable member, the movable member having two stable positions, a first of the two stable positions in which the movable member is adjacent to the fixed member and a second of the two stable positions in which only the two ends of the movable member are adjacent to the fixed member, the movable member being an elongated strip having a longitudinal direction and two natural stable positions with opposite convexities, the fixed member and the movable member together delimiting a totality of the opening, the opening providing access to the compartment; and a guide slot, at least one end of the strip being slideable in the guide slot.

2. The device according to claim 1, wherein the strip is made of metal and has projections which give the strip the two stable positions.

3. A bistable opening/closing device for a storage compartment, the opening/closing device mounted at the opening of the compartment, the opening/closing device comprising:

an opening delimited on a first side by a fixed member and delimited on a second side by an elongated flexible movable member, each of the fixed member and the movable member having two ends defining ends of the opening, the movable member being articulated with the fixed member at the two ends of the movable member, the fixed member and the movable member together delimiting a totality of the opening, the movable member having a length in a longitudinal direction, the length of the movable member unchanged on compression, the movable member having only one natural stable state, the movable member having two stable positions, a first of the two stable positions in which the movable member is adjacent to the fixed member and a second of the two stable positions in which only the two ends of the movable member are adjacent to the fixed member; and two slots, each of the two ends of the movable member being held in one of the two slots, the two slots spaced apart by a distance less than the length of the movable member, the two ends of the movable member being guided in the slots, wherein the two stable positions of the movable member are given to the movable member by the two ends being held in the slots.

4. The device according to claim 3, wherein the movable member is not longitudinally compressible, and the movable member assumes an S-shape when the movable member passes from one stable position to the other stable position.

5. A storage compartment having a bistable opening/closing device, the bistable opening/closing device mounted at the opening of the compartment, comprising:

a storage space having a side with a concave surface;

a cavity delimiting a rim surrounding the concave surface on a side of the storage space of the compartment;

an opening of the cavity delimited on a first side by a fixed member and delimited on a second side by an elongated flexible movable member, each of the fixed member and the movable member having two ends defining ends of the opening, the movable member being articulated with the fixed member at the two ends of the movable member, the fixed member and the movable member together delimiting a totality of the opening, the movable member having two stable positions, a first of the two stable positions in which the movable member is adjacent to the fixed member and a second of the two stable positions in which only the two ends of the movable member are adjacent to the fixed member, wherein, a concave surface of the fixed member is a portion of the cavity which delimits the rim surrounding the concave surface on the side of the storage space of the compartment; and a support carrying the movable member, the support having a surface which delimits part of the storage space of the compartment, a free edge of the movable member having two stable positions, in a first of the two stable positions the edge is adjacent to the concave surface of the fixed member and in a second of the two stable positions only ends of the edge are adjacent to the fixed member, wherein the opening is wholly delimited between the edge of the movable member and the concave surface of the fixed member, wherein, the support and the movable member are comprised from a flat material with a hole delimiting the edge of the movable member and an upper portion of the cavity delimiting an upper first part of a rim of the support, and a lower portion of the flat material between the edge of the movable member and a lower remainder of the rim of the support projects relative to the flat material.

6. The compartment according to claim 5, wherein the rim of the support is substantially adjacent to the rim of the cavity of the fixed member.

7. The compartment according to claim 5, wherein at least one of i) the flat material, and ii) the cavity of the fixed member is a nonwoven material.

8. The compartment according to claim 7, wherein the nonwoven material contains thermoplastic fibers.

9. The compartment according to claim 5, wherein the support is a lining selected from motor vehicle boot linings and seat-back linings.

10. A storage compartment having a bistable opening/closing device, the bistable opening/closing device mounted at the opening of the storage compartment, the storage compartment comprising:

a panel comprising the storage compartment;

an opening providing access to the storage compartment;

a fixed member delimiting one side of the opening;

a flexible movable member articulated with the fixed member at ends of the opening, the fixed and movable members together delimiting a totality of the opening, the movable member having two stable positions, a first of the two stable positions in which the movable member is adjacent to the fixed member and a second of the two stable positions in which only the two ends of the movable member are adjacent to the fixed member, a lenticular cavity formed in the panel, the lenticular cavity delimiting the storage compartment, wherein, the fixed member is a portion of the lenticular cavity formed in a panel and delimiting the compartment; and the flexible movable member defining a substantially semi-circular wall with a periphery, and an upper edge of the substantially semi-circular wall, the periphery of the semi-circular wall being fixed to the panel around the lenticular cavity, the semi-circular wall delimiting the compartment, the movable member being pressed against a wall of the lenticular cavity in the first of the two stable positions and moved away from the wall of the lenticular cavity in the second of the two stable positions.

* * * * *